United States Patent [19]

Berning et al.

[11] Patent Number: 4,930,866

[45] Date of Patent: Jun. 5, 1990

[54] THIN FILM OPTICAL VARIABLE ARTICLE AND METHOD HAVING GOLD TO GREEN COLOR SHIFT FOR CURRENCY AUTHENTICATION

[75] Inventors: Peter H. Berning, Sebastopol; Roger W. Phillips, Santa Rosa, both of Calif.

[73] Assignee: Flex Products, Inc., Santa Rosa, Calif.

[21] Appl. No.: 204,723

[22] Filed: Jun. 10, 1988

Related U.S. Application Data

[62] Division of Ser. No. 88,144, Aug. 21, 1987, Pat. No. 4,779,898, which is a division of Ser. No. 935,065, Nov. 21, 1986, Pat. No. 4,705,300.

[51] Int. Cl.[5] .......................... G02B 27/00; B42D 15/00

[52] U.S. Cl. .......................... 350/320; 350/166; 283/91; 356/71

[58] Field of Search .......................... 350/320, 164, 166, 1.6, 350/1.7; 356/71; 283/58, 91, 904

[56] References Cited

U.S. PATENT DOCUMENTS 3,858,977 1/1975 Baird et al. .......................... 350/166
4,705,300 11/1987 Berning et al. .......................... 283/91
4,705,356 11/1987 Berning et al. .......................... 350/166
4,779,898 10/1988 Berning et al. .......................... 283/58

*Primary Examiner*—Rodney B. Bovernick
*Assistant Examiner*—Loha Ben
*Attorney, Agent, or Firm*—Flehr, Hohbach, Test, Albritton & Herbert

[57] ABSTRACT

Thin film optical variable article to be used in a reflection mode having a gold to green color shift with angle for currency authentication and adapted to be carried by a substantially opaque currency sheet which serves as a substrate. The article includes a substantially transparent, optically thick element carrying a colorant and having first and second surfaces and a multilayer interference coating carried on one of said first and second surfaces. The article is adapted to be carried by the currency sheet so that the coating faces the currency sheet and the colorant carrying element serves as a superstrate facing the incident light. The multilayer interference coating is comprised of a substantially opaque layer of aluminum nearest the substrate, followed by a layer of magnesium fluoride, and then by a layer of chromium having substantial transmission. The colorant has a yellow hue whereby at normal incidence of light the article has a coppery-gold color shifting towards a vivid green at non-normal incidence of light. The colorant operates in an essentially subtractive mode to cause a modification of the normal incidence gold color and the color shift with angle properties as seen by reflection.

1 Claim, 2 Drawing Sheets

THIN FILM OPTICAL VARIABLE ARTICLE AND METHOD HAVING GOLD TO GREEN COLOR SHIFT FOR CURRENCY AUTHENTICATION

This is a division of application Ser. No. 088,144 filed 8-21-87, now U.S. Pat. No. 4,779,898, which is a division of Ser. No. 935,065 filed 11-21-86, now U.S. Pat. No. 4,705,300.

This invention relates to a thin film optical variable article and method having a gold to green color shift with change in the angle of incident light from normal to off normal for currency authentication.

In U.S. Pat. No. 4,705,356 there is a general description of the prior art. There is also a discussion of the disclosure in U.S. Pat. No. 3,858,977 in which it is pointed out that there is disclosed therein an optical interference authenticating means. This authenticating means is comprised of a substrate and a filter overlying and attached to the substrate. The filter is composed of an optical interference layer or series of layers having a known characteristic of spectral reflectance and a different known characteristic of spectral transmittance, both varying with the angle of incidence of light on the filter. The substrate has at least a portion thereof adjacent to the filter which has a specific color to absorb at least some of the light transmitted through the filter. The color reflected by the substrate is essentially additive to that reflected by the interference filter and thus in its effect on the overall reflected color. In general, therefore, the effect of the substrate is to dilute the color of the filter seen by itself. U.S. Pat. No. 3,858,977 also discloses the use of a carrier in the form of a transparent or colored polyester film. This polyester film may be retained as a protective covering or, alternatively, it can be removed after the filter has been attached to the substrate. There is no disclosure in U.S. Pat. No. 3,858,977 of the use of this carrier for any optical effect and in particular to provide any effects on the color of the optical interference authenticating means. The carrier merely serves as a mechanical carrier or a protective covering. U.S. Pat. No. 3,858,977 points out that authenticating means of this type would be difficult to imitate by counterfeiters. It has been found, however, that the approach taken in U.S. Pat. No. 3,858,977 for developing anticounterfeiting means has a number of deficiencies, especially the lack of a means of reducing certain unwanted color shift effects normally encountered in multilayer interference filters. There is therefore a need for a new and improved thin film optical variable article which overcomes the above-named deficiencies.

In general, it is an object of the present invention to provide a thin film optical variable article, used in a reflection mode, which has a gold to green color shift with a change in angle of incidence and viewing of reflected light.

Another object of the invention is to provide an article and method in which the gold and green colors are of relatively high purity.

Another object of the invention is to provide an article and method of the above character in which the gold and green colors have adequate luminous reflectance.

Another object of the invention is to provide an article and method of the above character in which there is a substantial absence of other colors at angles of incidence much greater than 45°.

Another object of the invention is to provide an article and method of the above character which utilizes a combination of a substantially transparent, optically thick, colorant carrying layer in conjunction with an interference coating and in which the optically thick colorant carrying layer and the interference coating are positioned so that the colorant operates in an essentially subtractive mode to modify the normal incidence gold color and the color shift with angle properties as seen by reflection.

Another object of the invention is to provide an article and method of the above character in which the color shift is very discernable by the normal human eye.

Another object of the invention is to provide an article and method of the above character which utilizes a colorant layer which is angle insensitive in its optical properties and a multilayer interference coating which is angle sensitive.

Another object of the invention is to provide an article and method of the above character which is particularly suitable for currency applications.

Another object of the invention is to provide an article and method of the above character in which hot die stamp transfer processes can be utilized for transferring the same onto currency.

Another object of the invention is to provide an article and method of the above character in which a print layer can be placed upon the transferred article.

Additional objects and features of the invention will appear from the following description in which the preferred embodiments are set forth in the accompanying drawings.

In general, the thin film optical variable article as viewed by reflected light has a gold to green color shift with angle for currency authentication and is adapted to be carried by a substantially opaque currency sheet serving as a substrate. The article is comprised of a structural element carrying a colorant and having first and second surfaces and a multilayer interference coating carried on one of the first and second surfaces. The article is adapted to be carried by the currency sheet so that the multilayer interference coating faces the currency sheet and the colorant carrying structural element serves as a superstrate facing the incident light. The multilayer interference coating is comprised of a substantially opaque layer of aluminum nearest the substrate, a layer of magnesium fluoride adjacent to the aluminum layer and a layer of chromium having substantial transmission adjacent to the magnesium fluoride layer. The colorant has a yellow hue. At normal incidence of light, the article has a coppery-gold hue and the colorant operates in essentially a subtractive mode to cause a modification of the gold color and the color shift with angle properties as seen by reflection.

Figure 1:
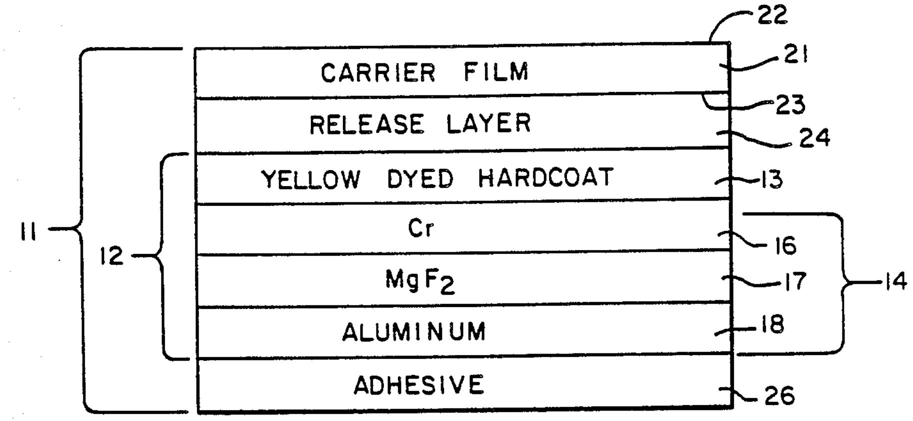
FIG. 1 is a cross sectional view of an article incorporating the present invention utilizing the combination of the colorant carrying dyed superstrate and a multilayer interference coating and which is provided with an adhesive layer to facilitate bonding the same to a substrate.

More in particular, as shown in FIG. 1, there is shown an optical variable article of the type which is carried by a transfer foil that can be shipped to the customer and which is provided with an adhesive to facilitate bonding of the article to currency. The design for the article has a normal incidence dominant wavelength in the range of 587–592 nanometers with a design tolerance of ±2% of the nominal dominant wavelength. The article 11 consists of a combination layered structure 12 incorporating the present invention. The combination layered structure 12 is comprised of a substantially transparent, optically thick, subtractive colorant carrying ("dyed hardcoat") layer 13, which serves as an element, and a multilayer interference coating 14. The optically thick colorant carrying layer is substantially insensitive to changes in angle of incident light whereas the multilayer interference coating 14 is decidedly angle sensitive. In the present invention, the colorant is yellow. Also in the present invention in which it is desired to use the article in connection with a hot die stamp process, the structural element 13 is formed of an acrylic type polymer carrying a commercially available yellow dye. By way of example the yellow dye can be Acetosol Yellow 5GLS (Solvent Yellow 42) supplied by Sandoz Colors and Chemicals Company. The element should have an absorbance between about 1.0 and 5.0 at a wavelength of about 430 nm, the wavelength of maximum absorbance.

The interference coating 14 is a three-layer vacuum deposited thin film combination and is comprised of a chromium layer 16, a magnesium fluoride layer 17 and an aluminum layer 18 in that order. The chromium layer 16 has a thickness such that it has a transmittance in the range of 30–40% at 550 nanometers for the chromium film by itself, and should preferably have a transmittance of approximately 35%. The magnesium fluoride layer has an optical thickness of 4.3 quarterwaves ±5% at a design wavelength of 550 nanometers.

The aluminum layer has a thickness such that it is essentially opaque and therefore has a transmittance at a 550 nanometer design wavelength of less than 0.1%. The aluminum layer can be deposited to an optical density of as low as 2.0 at 550 nanometers for essentially optimum optical characteristics, corresponding to approximately 300 Angstroms in physical thickness. For durability, however, the thickness preferably should exceed 500 Angstroms.

The combination of the subtractive colorant carrying superstrate 13 and the multilayer interference coating 14 are carried by a suitable carrier 21. Typically this carrier can be in the form of a flexible polymer film as, for example, a polyethlene terephthalate (PET) and having a suitable thickness as, for example, 50 gauge to 142 gauge. In general in connection with the present application in which it is desired to utilize the article in a hot die stamp transfer process, it is desirable to use the thinner gauge film if possible. The thinner gauge material is desirable in the hot stamp transfer process in order to obtain better resolution in the transfer process. The carrier film 21 is provided with an outer surface 22 and an inner surface 23. A release layer 24 is deposited on the inner surface 23. The release layer 24 can be formed from any number of commercially available materials, such as waxes and silicone type materials. An adhesive layer 26 is also provided as a part of the article and also is comprised of commercially available adhesives.

The article which is shown in FIG. 1 can typically be manufactured sequentially in a series of specialized roll coating machines. In the first machine the carrier film as it is advanced has deposited thereon, the release layer 24. Thereafter, the subtractive colorant carrying layer 13 is deposited thereon and when formed of the dyed acrylic as hereinbefore described forms a dyed hardcoat which is yellow. After this has been accomplished, the above developed transfer foil is placed in a vacuum deposition roll coater and the chromium layer 16 is deposited followed by the magnesium fluoride layer 17 and the opaque aluminum layer 18. After this multilayer interference coating has been deposited, the coated foil is removed from the vacuum chamber and the adhesive layer 26 is deposited thereon using an adhesive coating line. Typically the adhesive 26 can be of a material which is non-tacky at room temperature but which will become tacky when heat is applied thereto.

If desired it should be appreciated an adhesive which is tacky at room temperature can also be utilized. However, in such a case a covering layer (not shown) would have to be provided which would be removed when the article is to be used and before the article is applied by a hot stamp transfer operation. Alternatively, if desired, the release layer can be eliminated and the dyed hardcoat 13 can have incorporated therein a release agent to facilitate separation of the carrier film 21 from the combination of the present invention as hereinafter described.

Figure 2:
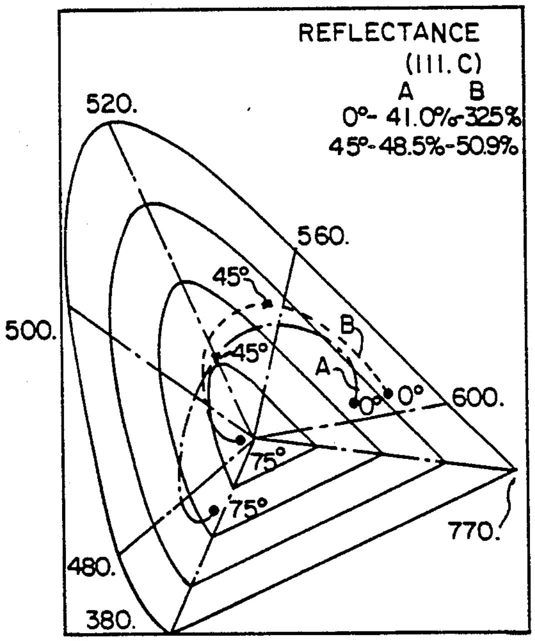
FIG. 2 is a chromaticity diagram of the design shown in FIG. 1, along with a design that omits the yellow dye in the hardcoat.

The chromaticity diagram for the gold to green color shift optical variable article utilizing the design shown in FIG. 1 is shown in FIG. 2. In these considerations it is assumed that the light source is Illuminant C. The computed chromaticity trajectory is shown plotted for angles of incidence ranging from 0° to 75°. As shown in the diagram, the design produces a coppery-gold color by reflection at 0° incidence and a shift to a vivid green color at around 45°. The 0°, 45°, and 75° incidence angle points are noted by asterisks on the trajectory for two curves A and B. Curve A represents the chromaticity for the case of no colorant in the superstrate. The design in this case is as follows:

[S]-Cr-4.25D-A1 (opaque)

(Design A in FIG. 2) where

[S] is the superstrate (index of refraction assumed to be 1.56 but may range from 1.4 to 1.8), and D is magnesium fluoride in quarterwaves at a design wavelength of 550 nanometers Curve B represents the chromaticity for a superstrate carrying a colorant i.e., the yellow dye of the present invention. The design in this case is as follows:

[S*]-Cr-4.35 D-A1 (opaque)

(Design B in FIG. 2) where

[S*] is the superstrate carrying the colorant and is characterized by a complex refractive index, the real part of which is assumed to be 1.56 but may range from 1.4 to 1.8 and the imaginary part of which varies with wavelength, and D is magnesium fluoride in quarterwaves at a design wavelength of 550 nanometers.

Luminous reflectance values at 0° and 45° for the two designs are tabulated in the upper right hand corner of FIG. 2.

The multilayer interference design by itself produces a coppery-gold color at normal incidence varying to a green color in the neighborhood of 45° angle of incidence and at steeper angles continues into the high purity blue color domain. Through use of the yellow dye in the superstrate, the steep angle colors are substantially eliminated as shown in the chromaticity diagram in FIG. 2. Curve B shown on FIG. 2 shows the feature because its loci of points terminates at the achromatic point which means "no color". Furthermore, the dye provides a fairly substantial increase in color purity at normal incidence and in the green color region at around 45° incidence as well. (Note: Addition of the yellow dye to a given filter design of the type considered also shifts the normal incidence dominant wavelength slightly, and this must be compensated for by an adjustment in the filter design. This adjustment was made in relation to the designs graphed in FIG. 2.) The color shift from the coppery-gold to the vivid green is very discernable to the normal human eye.

Use in the combination 12 of the subtractive colorant carrying layer 13 and the multilayer interference coating 14 renders reverse engineering and duplication of the article very difficult. Moreover, the color shift with angle properties of such a combination cannot be duplicated in conventional color copying machines. Copying machines would at most produce a particular color which does not shift with angle and which may be black. Duplication of the design of the present invention requires skill in two unrelated arts, namely, in multilayer interference coatings and also in colorant technology. Without knowing the exact design, it would be difficult for one viewing the article to ascertain the manner in which the color shift is obtained.

Figure 3:
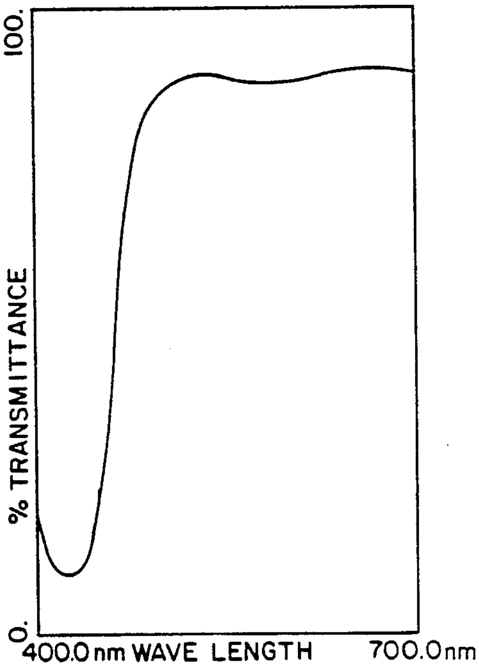
FIG. 3 is a transmittance curve for the isolated dyed element associated with the design shown in FIG. 1.

The transmittance curve of the dyed superstrate or layer 13 by itself is shown in FIG. 3. In the present design, the yellow dye serves several purposes. First it serves to substantially block out by absorption of reflected colors when the article is tilted at steep angles relative to the observer. In the present design it is only desired to see two basic colors, namely the coppery-gold color near 0° incidence and the green color in the neighborhood of 45°. But for the presence of the dye, a pronounced third color, namely, a high purity blue, would be seen in the range of incidence and viewing angles around 70°. The yellow dye also makes possible broader tolerances in producing the multilayer interference coating to obtain the desired optical properties. In addition, the yellow dye also enhances the visual effect of the two principal colors that are observed, particularly as regards increased purity.

Figure 4:
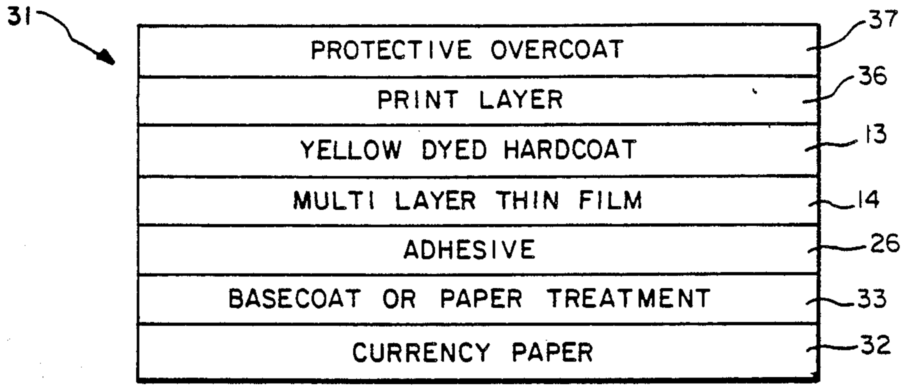
FIG. 4 is a cross sectional view of an article incorporating another embodiment of the invention showing the manner in which the article is used in connection with currency.

In FIG. 4, there is shown a cross-sectional view of a product utilizing the article of the present invention. As shown therein, the product consists of a flexible sheet of currency paper 32 which can be of a conventional type. In order to facilitate better adhesion of the article of the present invention to the currency paper, the currency paper, in at least the area the article is to be affixed, can be treated in a suitable manner. For example, it can be provided with a base coat 33 made of a suitable material such as a polymer or the paper itself can be treated with inks or other chemicals in the same area the base coat 33 is applied.

The article which is shown in FIG. 1, which can be in the form of a foil, can then be transferred onto the surface of the currency paper 32 in a suitable manner, as by the use of a hot die stamp transfer process well known to those skilled in the art. The foil would be positioned so that the adhesive layer 26 would be facing the side of the currency paper 32 to which the article is to be affixed. The die in the hot die stamp transfer process would engage the carrier film 21 and by the application of heat and pressure would cause the adhesive 26 to form a bond with the currency paper 32. When the die stamp is separated from the film, the carrier film 21 separates from the combination 12 of the present invention consisting of the yellow dyed hardcoat 13 and the multilayer interference coating 14 through the medium of the release layer which, as explained previously, can be a separate release layer 24 or can be a release ingredient incorporated into the yellow dyed hardcoat.

The article, after it has been applied to the currency paper, consists of the adhesive layer 26, the multilayer thin film 14 and the yellow dyed hardcoat 13. After the transfer of the article has been accomplished, a print layer 36 can be affixed to the yellow dyed hardcoat 13 in a suitable manner, such as by the use of an Intaglio press. It has been found that printing can be readily applied to the yellow dyed hardcoat by such a press. The ink penetrates to some degree into the yellow dyed hardcoat, and also some of the ink remains on the surface. The ink can be of a conventional type, for example, oxidative inks which cure slowly at room temperature to a hard material.

In order to protect the print layer 36 as, for example, to prevent scratching the print layer, a protective overcoat layer 37 is provided. This protective overcoat 37 can be formed of any suitable material. Preferably it should be another polymer which has a capability of being extensible, i.e., stretchable. It serves to encapsulate the entire article onto the currency paper 32. An oxidative material, a UV curable material or a two component thermal setting material can also be utilized for the protective overcoat 37.

It has been tacitly assumed in the foregoing discussion that the article of this invention is characterized by reflective properties that are essentially specular in character. That is to say there is no significant light scattering occurring from within the various layers or from their boundaries. Clearly, a marked departure from specularity would, of course, serve to substantially detract, if not destroy, the optically variable properties associated with the invention. However, a moderate degree of diffuseness can be tolerated without significant loss of color performance and may, in fact, be desirable to reduce any sense of "gaudiness" that might be associated with the specular colors of rather high luminance and purity that are present in this invention. Such controlled diffuseness can be accomplished in a number of ways, and in particular by the judicious choice of materials and/or processing used for the protective overcoat.

Figure 5A:
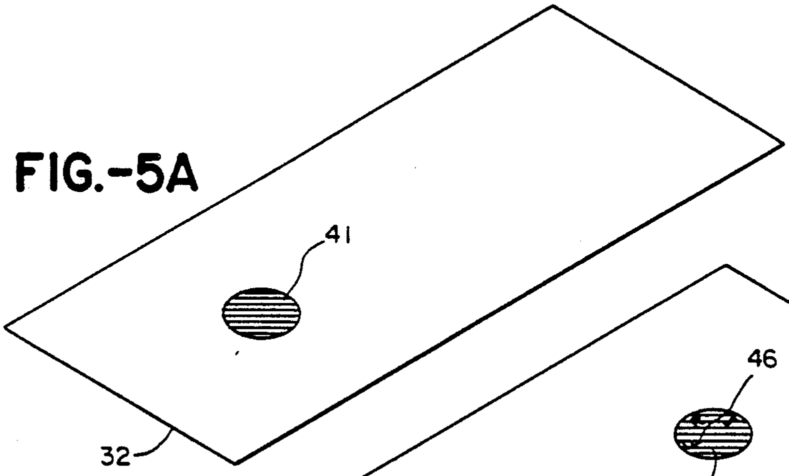
FIGS. 5A, 5B and 5C are representations showing various manners in which the article of the present invention may be utilized on currency.
Figure 5B:
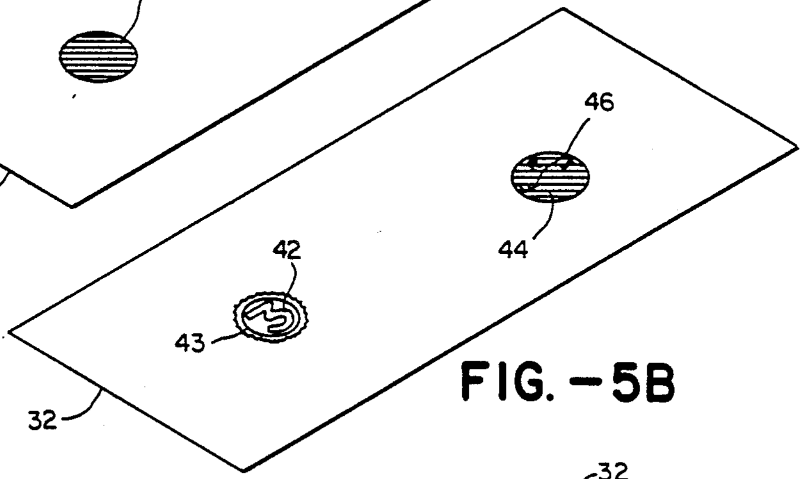
Figure 5C:
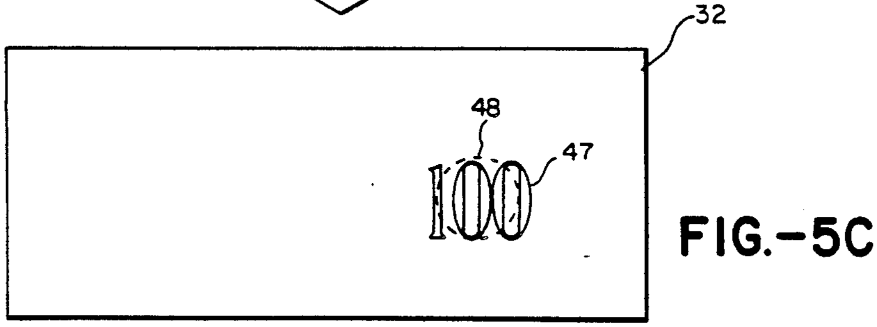

In FIGS. 5A, 5B and 5C there are shown examples of how the optical variable article of the present invention can be utilized in connection with currency. For example, as shown in FIG. 5A, a circular disc 41 has been transferred to a sheet of currency 32. In the simplest form, this disc could be die cut from the article of the present invention or could be hot stamped using a die having a disc pattern and would exhibit the gold to green color shift with angle hereinbefore described.

In FIG. 5B, a letter or number as, for example, the number 42 (which represents the number "3" depicted on the currency) formed of the optical variable article has been hot stamp transferred by a die onto the currency paper 32. The number or letter could be encircled in a design 43 in a suitable manner such as by printing. In addition another disc 44 of the optical variable article could be transferred to the same sheet of currency paper in another location spaced from the number 42. This disc 44 could have printed thereon indicia 46 in the manner hereinbefore described.

In FIG. 5C, the optical variable article has been transferred to the currency sheet 32 in the form of a pattern of letters or numbers as, for example, the numbers 47 which represent 100. The numbers have been overprinted with a print layer 36 in the form of a seal or other appropriate symbol 48 partially printed over the numbers 47 and partially onto the currency paper itself. Alternatively, the numbers 47 could be transferred to the currency sheet 32, whereby the numbers are partially on and partially off a seal or other printing that is already on the currency paper.

It can be seen that by using such a combination of numbers and letters, it is possible to prevent an optical variable article from being removed from a lower denomination bill and placed on a higher denomination bill. In effect, this would prevent a counterfeiter from attempting to upgrade the value of a bill by moving an optical variable article.

From the foregoing it can be seen that the present article and method has a ready application to the creation of currency which is very difficult, if not impossible, to counterfeit, without duplicating the essential structure of this invention. For example, the material to form the article can be provided in a foil in strip form carried on rolls. These rolls can be slit to form a plurality of ribbons and then these ribbons can be passed in parallel over currency sheets so that the multiple optical variable articles can be hot stamp transferred simultaneously to currency sheets so that a multiplicity of bills can be produced simultaneously from the stamping machines.

It can be seen from the foregoing that there has been provided an optical variable article and method which particularly lends itself to currency applications because of the coppery-gold to vivid green color shift that is provided, which is particularly discernable to the normal human eye. The article is very durable and can withstand the rough usage which paper currency incurs. In addition, the article is particularly effective in preventing counterfeiting of currency. It is particularly effective in preventing copies of currency being made on color copiers because of the inability of color copiers to duplicate the color shift characteristics of the optical variable article. Thus it can be seen that the optical variable article incorporated in the currency makes it possible for the lay person to readily distinguish counterfeit currency from genuine currency merely by examining the characteristics of the optical variable article carried on the bill.

What is claimed is:

1. In a method for providing a color shift in a colored article from a coppery-gold to vivid green with a change in angle of incidence of light and angle of viewing of reflected light from normal to approximately 45°, providing on the article a multilayer thin film coating and also providing a subtractive colorant carrying hardcoat to provide a coppery-gold color at normal viewing angle and to provide a vivid green at approximately 45° viewing angle with no marked additional color shift at steeper viewing angles.

* * * * *